Sept. 11, 1928.  
L. LEVY  
1,684,103  
ELIMINATION OF WIRELESS PARASITIC CURRENTS  
Filed Nov. 24, 1924

Inventor,
Lucien Lévy,
By Henry Orth  atty.

Patented Sept. 11, 1928.

1,684,103

UNITED STATES PATENT OFFICE.

LUCIEN LEVY, OF PARIS, FRANCE.

ELIMINATION OF WIRELESS PARASITIC CURRENTS.

Application filed November 24, 1924, Serial No. 751,997, and in France November 30, 1923.

This invention relates to a system which is designed to eliminate completely the "atmospherics" or parasitic perturbations and the perturbating stations by opposition to high frequency.

In previous patents I have already proposed in order to eliminate "atmospherics" by putting in opposition at high frequency the effects produced upon two oscillating circuits or artificial lines which have been tuned the one on a frequency slightly above and the other on a frequency slightly lower than that of the station which one wishes to receive.

The opposition of high frequency currents in the systems for eliminating "atmospherics" actually known has generally been deficient for the following reasons:

1. The high frequency receiving circuits are connected either electrically or magnetically; owing to said connection the "atmospherics" produce in every circuit two impulses and the opposition cannot be obtained simultaneously for both waves.

2. In the heterodyne or the autodyne reception the effect of local oscillations is not the same upon the parasitic perturbating currents of both oscillating circuits.

3. Lastly, the retroactive effect due to the grid-filament capacity of valves connected to the oscillating circuits is different.

The present invention obviates these drawbacks owing to the symmetrical mounting by means of which all the phenomena above mentioned are identical at both sides and compensate each other.

This invention consists:

1. In the symmetrical adjustment of the oscillating circuits whereby the electromotive forces induced by any wave whatever are the same.

2. In amplifying the tensions which have been induced by means of two strictly identical vacuum tube amplifiers (or two sets of amplifiers).

3. In opposing the action of both tubes or sets of tubes upon an oscillating circuit or upon an artificial line.

The opposition takes place for every impulse but does not take place for a forced oscillation adjusted to a frequency situated between the sound frequencies of the two oscillating circuits.

4. In producing the retroactive action of the amplified currents coming either from the opposing circuit itself or from an amplifying valve connected directly or not with said circuit.

The two oscillating circuits being symmetrically disposed, the grid-filament tensions are in phase for an impulse. The effect is the same with plate-filament tensions which consequently do not cause any lack of symmetry through plate-grid capacity.

The opposition is obtained by means of two couplings after amplifying which maintain the symmetry of the mounting, and not by reversing one of the oscillating circuits of the grid circuits relatively to the other.

The accompanying drawing shows by way of example several modes of execution of my invention.

Figure 1:
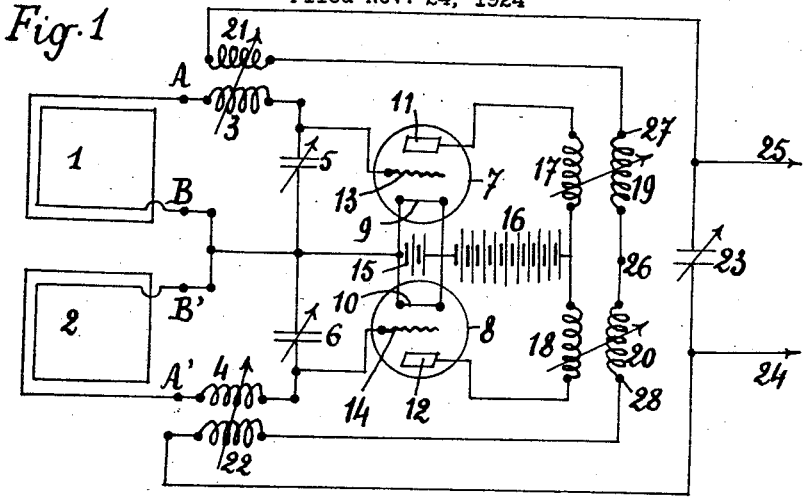
Fig. 1 shows a system of mounting designed to eliminate "atmospherics" and comprising opposing frames and radio frequency.

Referring to Fig. 1 which represents a mode of mounting designed to eliminate "atmospherics" provided with frames, the two frames 1, 2 which are similar and whose two corresponding extremities are designed respectively by A, A' and B, B' constitute together with the self induction coils 3, 4 and the variable condensers 5, 6 the two receiving circuits. The frames are placed in such a manner that there is no coupling. The circuits 1, 3, 5 and 2, 4, 6 are tuned on wave-lengths that are slightly longer and slightly shorter respectively than that of the station to be received and are placed respectively between the filaments 9, 10 and the grids 13, 14 of valves 7, 8. The plate-circuits 11, 17, 16 and 12, 18, 16 pass respectively through the self induction coils 17 and 18 and have a common battery 16. The filaments 9, 10 are heated by an accumulator 15. The two self induction coils 17, 18 are respectively coupled to the two self induction coils 19, 20 placed in the oscillating circuit 19, 20, 23 tuned on the frequency to be received. The currents flowing through said circuit 19, 20, 23 under the action of an electromotive force which results from the difference of the electromotive forces induced by 17, 18, re-act in the grid circuits through the self induction coils 21, 22 respectively coupled to the self induction coils 3, 4 having a low reactance.

The tension collected at the terminals 24, 25 is then amplified in a high frequency amplifier and directly or indirectly transformed into high frequency currents.

The mode of operation is as follows.— The electromotive forces B A and B' A' induced by a wave are quite identical and it is the same for the tensions 9, 13 and 10, 14, the self induction coils 3 and 4 having a low impedance. It is the same also owing to the precautions taken, with the amplified tensions 26, 27 and 26, 28. The whole of the tension produced by any parasitic impulse between 27 and 28 is therefore of no account.

On the contrary, in case of a forced oscillation produced by a wave maintained at a predetermined frequency intermediate between the adjustment of the two oscillating grid circuits, the current in one of the circuits 1, 3, 5 for instance is in advance and the current in the other circuit 2, 4, 6 is behind time with the electromotive force induced by the wave in said circuits and there exists consequently a displacement of phase between both grid-filament-tension. Therefore opposition is not produced in 27, 28 and owing to the retroactive action of the couplings 21, 3 and 22, 4, the displacement of phase between each of the grid-filament tensions and the electromotive force induced by the wave tends to become 90°, one of the tensions being in advance and the other behind time when nearing the normal state. The grid tensions become consequently in opposition as to phase and the tensions 26, 27 and 26, 28 are also in opposition as to phase. The amplified forces from both frames give therefore in the oscillating circuit 28, 27, 23 the highest action in the direction of the wave to be received.

It is evident that connections between the plate circuit of an amplifying valve whose grid-circuit would be connected at 24, 25 might be substituted for the couplings 21, 3 and 22, 4 which have a retrospective action.

Figure 2:
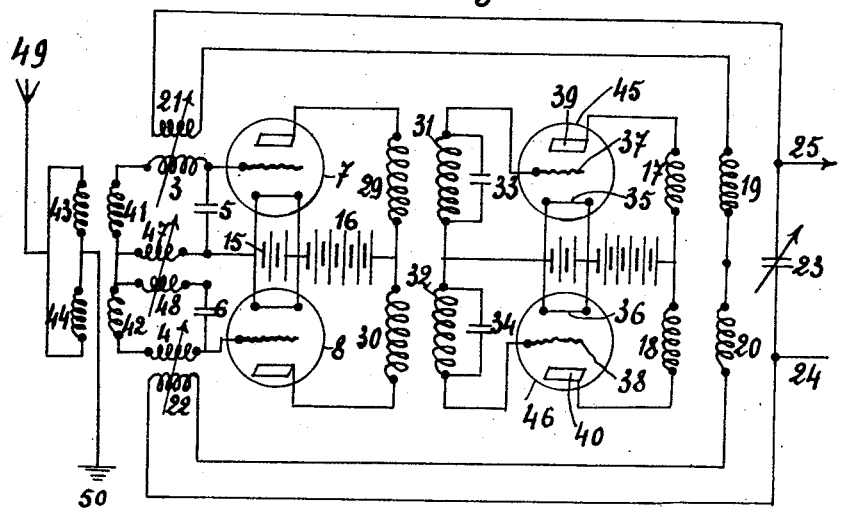
Fig. 2 shows a system of mounting eliminating "atmospherics" comprising an opposition antenna with radio frequency and two "atmospherics" eliminating stages.

Fig. 2 shows a receiving station capable of eliminating the "atmospherics" or parasitic disturbances having two stages and an antenna. In this diagram of connections in order to secure a better atmospherics eliminating selection, the atmospherics eliminating mounting is repeated twice. It will be noted that owing to the new method of mounting there can be used as many stages as will be necessary and that the eliminating of the "atmospherics" can reach any predetermined value and this consitutes a very great improvement.

The antenna 49 is connected with the two identical self induction coils 43, 44 coupled respectively to the self induction coils 41, 42. The oscillating circuits 41, 47, 5, 3 and 42, 48, 6, 4, are slightly out of tune on both sides of the adjustment corresponding to the frequency to be received.

Like reference numbers indicate corresponding parts in Figs. 1 and 2.

35, 36 are the filaments, 37, 38 the grids and 39, 40, the plates for the valves 45, 46 of the second stage. The connection 47, 48 allows of compensating the connection existing between the two oscillating circuits owing to their connection with the antenna.

In the plate circuits are placed the self induction coils 29, 30 connected to the two slightly mistuned circuits 31, 33 and 32, 34. The self induction coils 17 and 18 are connected to the circuit 19, 20, 21, 22.

Figure 3:
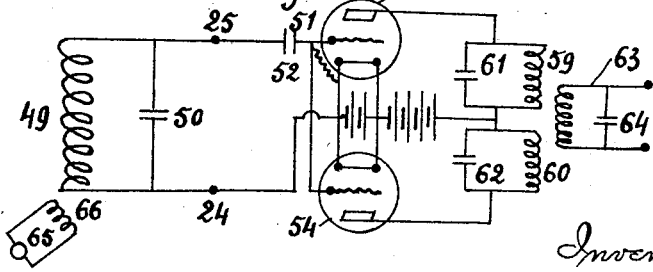
Fig. 3 shows an arrangement designed to eliminate "atmospherics" with opposition after transformation of frequency.

Fig. 3 shows a mounting arrangement which allows of eliminating upon a modulating frequency produced at the sending station and which may be audible or preferably not audible according to the principles described in my previous patents. Atmospherics or parasitic perturbations are then eliminated upon the modulating frequency with one or several atmospherics eliminating stages. 49, 50 designates the oscillating circuit, 49 being for instance a frame upon which the radio modulated frequency is tuned. 51, 52 designates the shunted condenser of the two detecting valves 53, 54. In the filament plate-circuits of the detecting valves are placed the circuits 62, 60 and 61, 59 which are slightly mistuned on both sides of the modulating frequency. Circuit 63, 64 is tuned on the modulating frequency. As before, the tensions to the modulating frequency are the only ones which do not oppose themselves, owing to the displacement of the phase of the tensions to the modulating frequency upon the electromotive forces at the same frequency. The arrangement of the mounting shown in Figs. 1 or 2 and that shown in Fig. 3 may be combined.

It will only be necessary to put said figures in juxtaposition, considering that circuit 19, 20, 22, 23, 21 of Fig. 1 or Fig. 2 is substituted for the circuit 49, 50 in Fig. 3 and would be connected at 24, 25 in Fig. 3. When the wave is not modulated to the frequency a heterodyne generator 65 is then connected through coil 66 to the self induction coil 49 in order to produce audible or not audible impulses.

In the case of receiving double modulated waves four frames might be used instead of two tuned by pairs on each side of each of the frequencies to be received.

It is also to be noted that in the diagrams shown, artificial lines may be substituted for the oscillating circuits, for instance in telephony and that auto-transformers may be substituted for the transformers.

I claim:

1. An antiparasitic system of wireless telephonic and telegraphic transmission comprising two receiving circuits symmetrically distuned with respect to the waves to be received, means for symmetrically amplifying the energy from said circuits, a third circuit and means to oppose the amplified energies in said third circuit at radio frequencies.

2. An antiparasitic system of wireless telephonic and telegraphic transmission, which comprises two receiving circuits symmetrically distuned with respect to the wave to be received, means to symmetrically amplify the energy delivered by such circuits, an oscillating circuit and means to oppose the amplified energy on the oscillating circuit at radio frequency.

3. An antiparasitic system of wireless telephonic and telegraphic transmission comprising two receiving circuits symmetrically distuned with respect to the wave to be received, identical amplifying tubes placed symmetrically in the two circuits to amplify the energy therein, a third circuit and means to oppose said amplified energies in said third circuit at radio frequency.

4. An antiparasitic system of wireless transmission comprising two receiving circuits symmetrically distuned with respect to the waves to be received, means for symmetrically amplifying the energy coming through said circuits, a third circuit and means to impose on said circuit at radio frequency the amplified energies in opposition, and means to symmetrically send to the receiving circuits amplified energy from said third circuit.

5. An antiparasitic system of wireless transmission which comprises two circuits submitted to the action of waves to be received, and slightly distuned to both sides of the wave to be received, means to amplify the energies received to radio frequency to produce symmetrical dephased energies in a plurality of stages and a circuit in which the amplified energies are opposed at radio frequency.

6. An antiparasitic system of wireless transmission which comprises two circuits submitted to the action of the waves to be received and slightly distuned on both sides of the waves to be received, means for amplifying the energies received to radio frequency to produce symmetrical de-phased energies in a plurality of stages, means for opposing the energies at radio frequency and means to produce, after opposition, symmetrical retroaction of the energy resulting from such opposition.

7. An antiparasitic system of wireless transmission comprising local means to transform the frequency of the waves to another radio frequency, two circuits tuned symmetrically to both sides of such other local frequency and means to oppose to the local frequency the energies of said circuits.

8. An antiparasitic system of wireless transmission which comprises a receiving circuit, means for producing beats therein, two detectors in parallel with such beats, two tuned circuits, one of which is tuned above and the other tuned below the frequency of the beats, and means to oppose the energies of said two circuits.

9. An antiparasitic system of wireless transmission which comprises two receiving circuits symmetrically distuned with respect to the waves to be received, means to symmetrically amplify the energy of said circuits, and means to oppose the energies of said circuits on an artificial line.

In testimony that I claim the foregoing as my invention, I have signed my name.

LUCIEN LEVY.